UNITED STATES PATENT OFFICE.

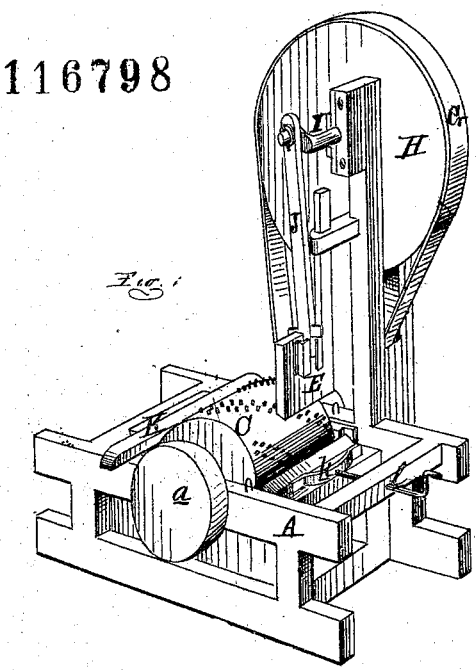
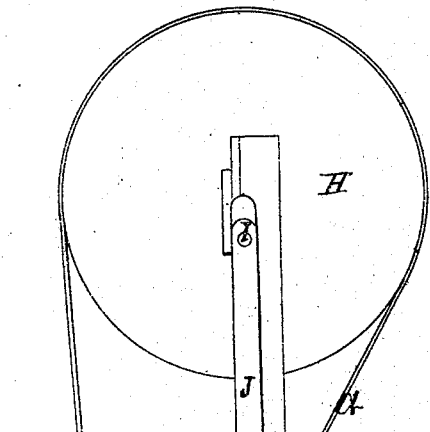
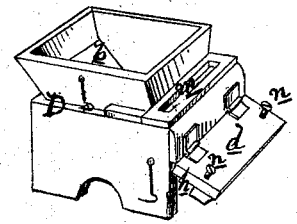
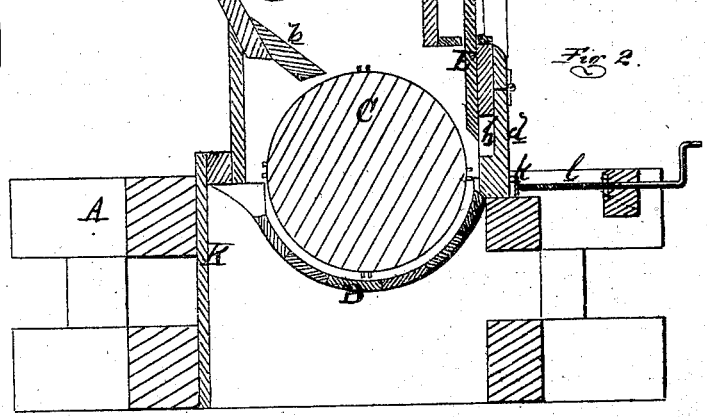

WATSON BARR, OF YPSILANTI, MICHIGAN.

IMPROVEMENT IN CIDER-MILLS.

Specification forming part of Letters Patent No. 116,798, dated July 11, 1871.

*To all whom it may concern:*

Be it known that I, WATSON BARR, of Ypsilanti, in the county of Washtenaw and State of Michigan, have invented a new and useful Improvement in Cider-Mills; and I do declare that the following is a true and accurate description thereof, reference being had to the accompanying drawing and to the letters of reference marked thereon, and being a part of this specification, in which—

Figure 1 is a perspective view of my invention with the hopper removed. Fig. 2 is a vertical section of the same on the line $xx$ in Fig. 1.

Like letters refer to like parts in each figure.

In grinding apples for the purpose of cider-making, in order to obtain the greatest product from a given amount of fruit it is necessary that the fruit should be thoroughly and finely ground, and, at the same time, the seeds should not be broken or crushed, as the flavor of the seeds tends to make the cider bitter. Various machines are in use for this purpose where the grinding of the fruit is done by means of a toothed cylinder, but they are all, so far as my knowledge extends, deficient in some particulars to make their action certain and the results such as are desired.

The nature of this invention relates to an improved construction of a mill for grinding fruit for the purpose of cider-making, by means of which the fruit is finely ground without breaking or crushing the seeds; so constructed that there can be no choking of the apparatus; and so arranged that no injury can arise from the introduction of stones or other foreign substances; and by the use of which a larger product is obtained than is had where the fruit is reduced to pomace by the mills in ordinary use. The invention consists: 1st, in a concave constructed in segments, in combination with a toothed cylinder and with a reciprocating plunger. 2d, an arrangement of the various parts to form a complete whole, as more fully hereinafter described.

In the accompanying drawing, A represents a suitable frame, to which are secured the operating parts. B is a concave made in segments, as shown in Fig. 2, the ends of said segments resting in correspondingly - shaped grooves (not shown) upon the inner sides of the frame. This concave is made in segments, so that more or less segments may be used, as may be desired; and if by any accident the concave should be broken only that broken segment would require to be replaced. C is a cylinder provided with several series of spirally-placed teeth, arranged like the teeth in a thrashing-machine cylinder. The teeth should be very short, for, if too long, they will tear the fruit into shreds, and not grind them into pulp. This cylinder is driven by the pulley $a$ from any suitable power. D is a hopper-box, shown in perspective in Fig. 3, provided with an inclined shelf, $b$, which gives a direction to the falling fruit to the top of the cylinder and in the direction of its revolution. This hopper-box is provided on its rear side with a hinged door, $d$, upon the inside of which is a recess, $h$, to receive stones or other foreign substances which may be accidentally discharged with the fruit upon the cylinder. A spring, $k$, and set-screw $l$ allow the door to give when larger stones are thrown into the recess than it is designed to receive. A slot, $m$, through the top of the hopper-box, acts as a guide to the plunger E. Set-screws $n$ are designed to adjust the door $d$ so that it will not interfere with the teeth of the cylinder. A pulley (not shown) secured to the end of the cylinder-shaft and belt G gives motion to the pulley H and crank-shaft I. The plunger E is connected with this crank-shaft by the pitman J, and is so arranged that in its reciprocation it drives the fruit into the concave at $r$, so that it will be brought into direct contact with the teeth of the cylinder. K is an apron suspended in front of the cylinder and concave and between the sides of the frame to prevent the revolutions of the cylinder from throwing out the ground fruit, and compelling the same to fall, after being delivered from the concave, into proper receptacles.

I am aware that cylinders and concaves are employed in thrashing-machines, and that doors for the removal of stones and foreign substances are also employed in thrashing and brick-making machines; and, therefore, do not claim them, broadly, as my invention.

What I claim as my invention, and desire to secure by Letters Patent, is—

1. The combination of the concave B, cylinder C, and plunger E, constructed and arranged substantially as and for the purposes set forth.

2. The arrangement of the frame A, concave B, cylinder C, hopper-box D, plunger E, pulleys F H, belt G, crank-shaft I, pitman J, and apron K, when each part is constructed and combined to operate substantially as and for the purposes set forth.

WATSON BARR.

Witnesses:
THOS. S. SPRAGUE,
H. F. EBERTS.